United States Patent
Tertinek et al.

(10) Patent No.: US 11,323,294 B2
(45) Date of Patent: May 3, 2022

(54) ULTRA-WIDEBAND DEVICE POWER OPTIMIZATION

(71) Applicant: NXP B.V., Eindhoven (NL)

(72) Inventors: Stefan Tertinek, Graz (AT); Filippo Casamassima, Graz (AT); Wolfgang Eber, Graz (AT)

(73) Assignee: NXP B.V., Eindhoven (NL)

( * ) Notice: Subject to any disclaimer, the term of this patent is extended or adjusted under 35 U.S.C. 154(b) by 234 days.

(21) Appl. No.: 16/736,872

(22) Filed: Jan. 8, 2020

(65) Prior Publication Data

US 2021/0211327 A1     Jul. 8, 2021

(51) Int. Cl.
*H04W 4/00*      (2018.01)
*H04L 25/02*    (2006.01)
*H04L 25/03*    (2006.01)

(52) U.S. Cl.
CPC .... *H04L 25/0212* (2013.01); *H04L 25/03292* (2013.01)

(58) Field of Classification Search
None
See application file for complete search history.

(56) References Cited

U.S. PATENT DOCUMENTS

| | | | |
|---|---|---|---|
| 2007/0259629 A1 | 11/2007 | Lee et al. | |
| 2011/0292820 A1* | 12/2011 | Ekbal | G01S 5/14 370/252 |
| 2019/0140593 A1 | 5/2019 | Sloushch et al. | |
| 2020/0005566 A1 | 1/2020 | Jain et al. | |
| 2020/0014526 A1* | 1/2020 | Hammerschmidt | H04L 25/0212 |
| 2020/0106877 A1* | 4/2020 | Ledvina | H04M 1/72457 |
| 2020/0280952 A1* | 9/2020 | Sasoglu | H04W 84/12 |
| 2020/0284897 A1* | 9/2020 | Padaki | G01S 7/006 |
| 2020/0287959 A1* | 9/2020 | Li | H04W 72/0446 |
| 2021/0072029 A1* | 3/2021 | Marques | H04W 4/021 |

(Continued)

FOREIGN PATENT DOCUMENTS

| | | |
|---|---|---|
| CN | 110650517 A | 1/2020 |
| WO | 2015/135630 A1 | 9/2015 |

OTHER PUBLICATIONS

Grosswindhager et al., "Enabling Runtime Adaptation of Physical Layer Settings for Dependable UWB Communications," 19th IEEE Intl. Symp. on a World of Wireless, Mobile and Multimedia Networks, WoWMoM, Jun. 2018; 11 pages.

(Continued)

*Primary Examiner* — Phirin Sam

(57) ABSTRACT

An ultra-wideband (UWB) wireless communication system, comprises a first wireless apparatus; a second wireless apparatus that participates in a first ranging sequence with the first wireless apparatus; and a transmission channel between the first and second wireless apparatuses that transmits data of the first ranging sequence. At least one of the first wireless apparatus or second wireless apparatus generating at least one channel impulse response (CIR) and determining from the at least one CIR whether the transmission channel includes a line-of-sight channel. A special purpose processor reduces a current performance level of at least one of the first and second wireless apparatuses during a second ranging sequence in response to a determination that the transmission channel includes the line-of-sight channel.

19 Claims, 7 Drawing Sheets

(56) References Cited

U.S. PATENT DOCUMENTS

2021/0072373 A1*  3/2021  Schoenberg .......... G01S 13/878
2021/0076163 A1*  3/2021  Burowski ............. H04W 4/029
2021/0099884 A1*  4/2021  Marquez ............. H04B 17/336

OTHER PUBLICATIONS

"IEEE Standard for Information Technology—Telecommunications and Information Exchange Between Systems—Local and Metropolitan Area Networks—Specific Requirement Part 15.4: Wireless Medium Access Control (MAC) and Physical Layer (PHY) Specifications for Low-Rate Wireless Personal Area Networks (WPANs)", Amendment 1: Add Alternate PHYs, Jan. 1, 2007, pp. 1-203.

* cited by examiner

ULTRA-WIDEBAND DEVICE POWER OPTIMIZATION

FIELD

The present disclosure relates generally to ultra-wideband (UWB) ranging technologies, and more specifically to systems and methods for channel-dependent power optimization of UWB ranging devices.

BACKGROUND

Ultra-wide band (UWB) technology is implemented in wireless electronic communications transceivers because of its exceptional positioning accuracy and high data throughput as compared to other wireless technologies, in particular, those including Internet-of-Things (IoT) devices. One application includes the implementation of a UWB computer chip in a key fob, smartphone, or other remote electronic device for the remote digital access and control of an automobile's computer processors via one or more antenna anchors mounted in the automobile in order to lock or unlock a door of the automobile or other remote functions.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
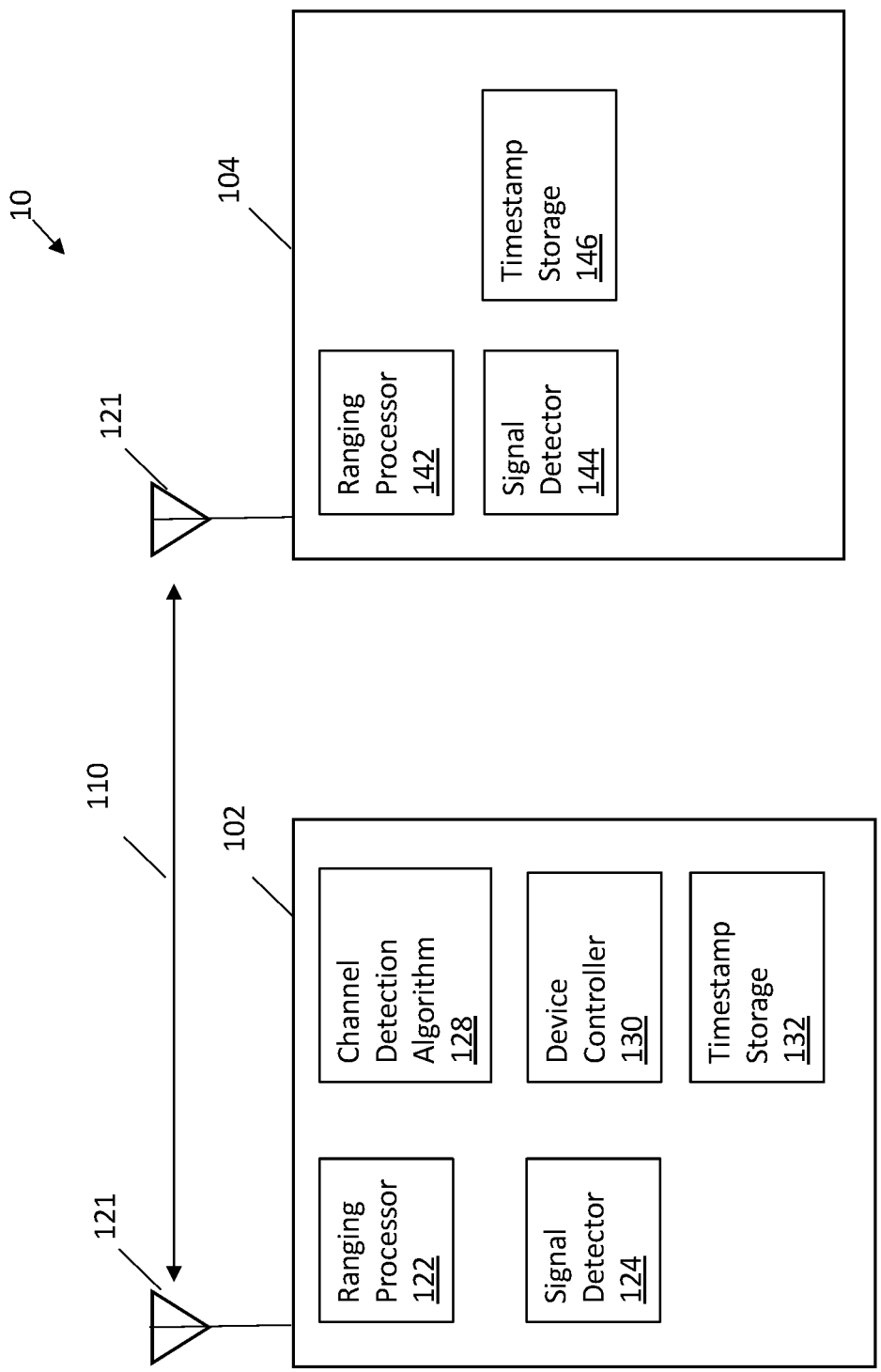
FIG. 1 is a block diagram of a UWB communication system, in accordance with some embodiments.

In order to capitalize on the advantages of positioning accuracy and high data throughput as compared to other wireless technologies, UWB transceivers or the like in compliance with an IEEE 802.15.4 system typically transmit 500 MHz or 1 GHz pulses in order to allow a determination of time-of-flight (ToF) or related signal strength measurements, which in turn provide an accurate estimate of distance between the UWB transceivers. To achieve this, the UWB transceivers typically operate according to a fixed configuration for a specific pre-programmed application in a manner that produces the best possible performance by the UWB devices participating in a ranging operation that includes measuring distances between the UWB transceivers to obtain a position of the initiator transceiver to the responder transceiver with the best possible ranging accuracy.

However, considerable power consumption is required to achieve the high-accuracy ranging potential according to the fixed configuration of the transceivers in the UWB system, which can reduce battery life.

In brief overview, embodiments of the present inventive concepts adapt the performance of UWB apparatuses of an electronic exchange to be dependent on a measured channel condition, thereby optimizing power consumption during device operation. Preferred applications include the implementation of power reduction techniques in a ranging operation performed between a user's key fob, smartphone, or other mobile electronic device, and an automobile anchor in a manner that permits an electronic communication to be performed between these devices in a manner that reduces the power requirement of the key fob's battery or other power source.

In some embodiments, an ultra-wideband (UWB) wireless communication system comprises a first wireless apparatus (also referred to as a ranging initiator apparatus) such as the abovementioned key fob or the like and a second wireless apparatus (also referred to as a responder apparatus) such as the abovementioned automobile anchor or the like that participate in a plurality of ranging sequences via a transmission channel formed between a transmission channel between the first and second wireless apparatuses. A ranging sequence may include a message including a UWB preamble output from the ranging initiator apparatus to the responder apparatus. In doing so, the ranging initiator apparatus stores a first time stamp of the transmission. The responder apparatus receives the message and processes the preamble to determine a channel impulse response (CIR) as well as a second time stamp, or time-of-arrival (ToA), from the CIR. After a predetermined time, or third time stamp, the responder apparatus outputs a message to the ranging initiator apparatus that includes the second and third time stamps. The ranging initiator apparatus receives the message and determines a CIR estimate and ToA, or fourth time stamp. The ranging initiator apparatus also computes a time of flight (ToF) and range from the first through fourth time stamps. Finally, the ranging initiator apparatus determines whether a line-of-sight (LOS) is detected from the CIR estimate. If the LOS is detected, then the ranging apparatus reduces its own device performance for a subsequent ranging sequence.

FIG. 1 is a block diagram of a UWB communication system 10, in accordance with some embodiments. In some embodiments, the UWB communication system 10 complies with the IEEE 802.15.4 technical standard, incorporated by reference herein in its entirety. As shown, a ranging initiator apparatus 102 and a responder apparatus 104 exchange data via one or more transmission channels 110, collectively referred to as a communication path or link.

The ranging initiator apparatus 102 includes a UWB wireless transceiver or the like. Accordingly, the ranging initiator apparatus 102 may also be referred to as a first UWB wireless transceiver, and may be part of a user's wireless UWB device along with an omnidirectional antenna 121 and corresponding processor for transmitting data using techniques which cause a spreading of the radio energy over a UWB band of a transmission channel 110. In some embodiments, the ranging initiator apparatus 102 and/or receiver apparatus 104 includes transceiver circuitry and an associated antenna 121 that detect and quantify an UWB signal. In some embodiments, the first UWB wireless transceiver 102 operates as a ranging initiator, and can therefore be incorporated in various wireless applications, such as a key fob or other security hardware device used to control and secure access to the computer systems of other mobile devices.

The ranging initiator apparatus 102 includes a power source such as a coin cell battery or the like. As described above, embodiments of the inventive concept improve life expectancy of the battery by performing channel-dependent power optimization techniques, and in doing so reducing current consumption of the ranging initiator apparatus 102, in particular, when an LOS channel is detected as part of an electronic communication between the ranging initiator apparatus 102 and responder apparatus 104.

The responder apparatus 104 also includes a UWB wireless transceiver or the like. Accordingly, the responder apparatus 104 may also be referred to as second UWB wireless transceiver 104, which includes an antenna anchor or related device that detects UWB pulses emitted by the first UWB wireless transceiver 102 and forwards them to a central processing unit (CPU) or other location detection system for calculating positions of the first UWB wireless transceiver 102. Signals exchanged with the ranging initiator apparatus 102 and output via a transmission channel 110 as part of a ranging operation includes an exchange of data packet preamble data or the like used to generate time-of-flight (ToF) estimates as part of a ranging operation to provide spatial awareness and relative positioning with accuracy among the UWB apparatuses 102, 104.

In order to detect, demodulate, and/or decode signals received from the first UWB wireless transceiver 102, the second UWB wireless transceiver 104 includes an antenna 121. In some embodiments, the first UWB wireless transceiver 102 and/or the second UWB wireless transceiver 104 includes both a transmitter and receiver, and exchange data wirelessly via an antenna 121. Although a single antenna 121 is shown, the wireless device (the first UWB wireless transceiver 102 and/or the second UWB wireless transceiver 104) may include multiple transmitters, multiple receivers, multiple transceivers, and/or multiple antennas. The antenna 121 may communicate with a signal detector 144 or the like that detects and quantifies the signals received by the transceiver 104, for example, energy levels, power spectral density and so on. In some embodiments, the first and second wireless transceivers 102, 104 are each part of a wireless device that includes one or more hardware processors that controls the operation of transceiver circuitry and an associated antenna 121 and a memory device for storing program code for execution by the processing unit to perform the processing required to control the transceiver 102, 104.

In addition to the antenna 121, the ranging initiator apparatus 102 may include but is not limited to a ranging processor 122, a signal detector 124, a channel detection algorithm 128, a device controller 130, and a time stamp storage device 132, which can be part of one or more hardware processors, software, or a combination thereof. The device controller 130, preferably part of at least the ranging initiator apparatus 102, reduces or otherwise changes or optimizes the performance of the device to reduce power consumption when an LOS channel is detected in a transmission between the transceivers of the ranging initiator apparatus 102 and responder apparatus 104.

The responder apparatus 104 may include components similar to those of the ranging initiator apparatus 102, for example, a ranging processor 142, a signal detector 144, and a time stamp storage 146.

The signal detector 124 detects and quantifies the signals received, for example, energy levels, power spectral density and so on. The ranging processor 122 estimates the instant on which the signals are received via a transmission channel 110. In response to a receipt of data signal, for example, including a preamble at the beginning of a data packet including relevant data to synchronize the UWB apparatuses 102, 104, the ranging processor 122 generates a CIR, which is used to generate a time stamp that includes a ToA estimate. The ToA time stamps stored at the storage device 132, 146 by the two apparatuses 102, 104 are used to estimate a time-of-flight as part of a ranging operation, which may include but not limited to calculating the roundtrip time of challenge/response packets or other related calculations.

The channel detection algorithm 128 communicates with the ranging processor 122 and signal detector 124 to determine a channel type with respect to an electronic communication between UWB transceivers 102, 104. In particular, the channel detection algorithm 128 can distinguish an LOS channel from an NLOS channel, which is relevant in order to obtain an accurate estimate of the performance of a system in accordance with the IEEE 802.15.4a channel model.

In particular, it is important for the channel detection algorithm 128 to detect LOS channels in order to optimize power consumption in accordance with embodiments of the present inventive concepts. In many ranging applications, an LOS condition occurs when there is a direct unobstructed path between the ranging initiator apparatus 102 and the responder 104. An example is shown in FIG. 1 where an automobile parked in an open area and the user holding a key fob 102 approaches an automobile, and in doing so, a direct electronic communication is established via the transmission channels 110 between the ranging initiator apparatus 102 (e.g., key fob) and the responder 104 (e.g., UWB anchor of the automobile).

Figure 2:
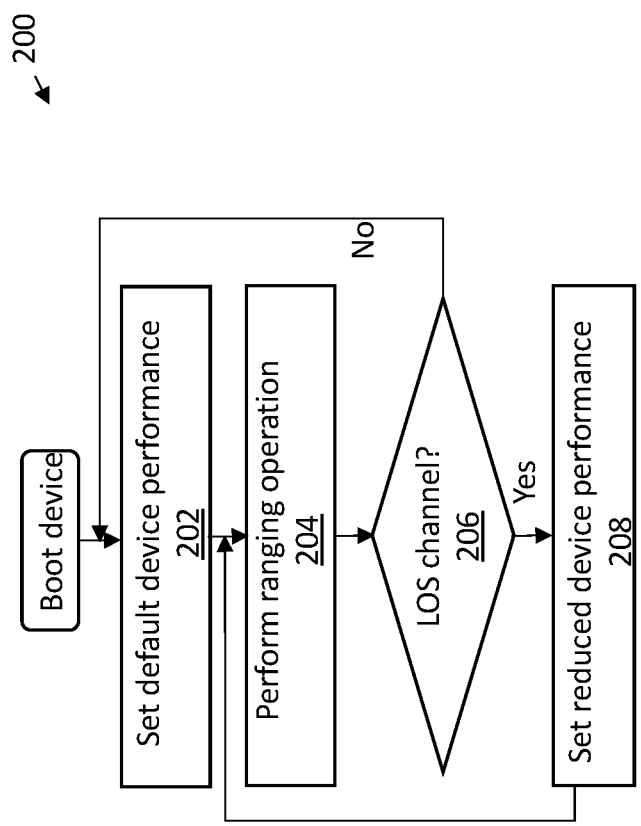
FIG. 2 is a flowchart illustrating a method for optimizing power consumption of a UWB ranging initiator apparatus, in accordance with some embodiments.

The device controller 130 is constructed and arranged to reduce the performance of the UWB transceiver 102, for example, executing a method 200 described with respect to FIG. 2.

Figure 3:
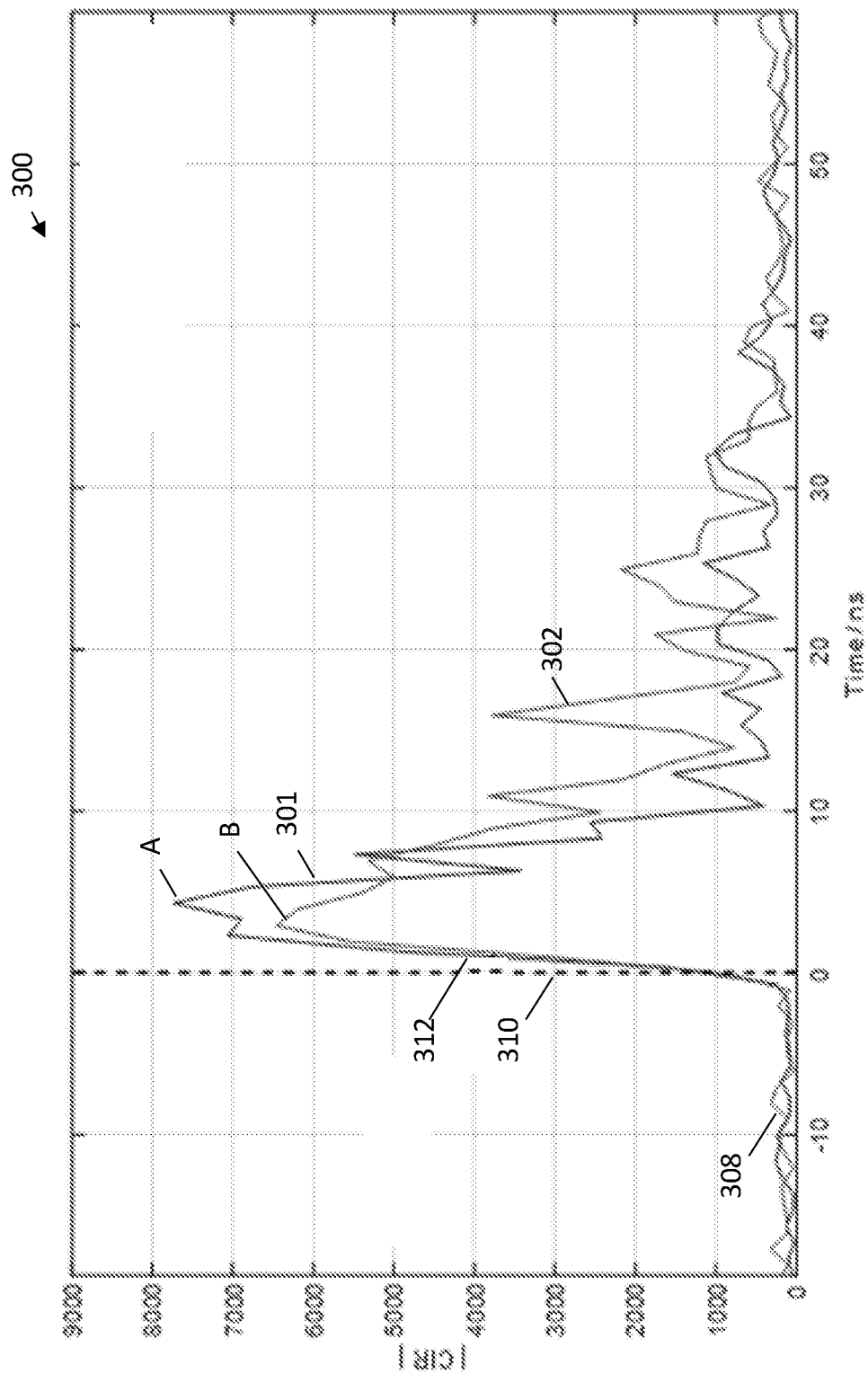
FIG. 3 is a graph illustrating a measured channel impulse response (CIR) for two line-of-sight (LOS) channels including data for performing a time-of-arrival (ToA) calculation between a UWB initiator apparatus and a UWB responder apparatus, in accordance with some embodiments.

FIG. 3 illustrates a graphical representation 300 of such an LOS condition. Here, two CIRs are measured at two different positions of the ranging initiator apparatus 102 with respect to the responder 104 at the automobile. The strong peaks, A, B of the measured CIRs 301, 302, respectively, each corresponds to a direct (LOS) path, i.e., with little reflection. The leading edge 312 of the CIRs 301, 302 is the edge extending from a noise regime 308, which is a region of the signal prior to the region of interest where peaks A, B are located after a first path 310 detected by the signal detector 124 of the responder 104. The detected first path 310 is processed as a reference to generate a time stamp used to compute the distance between UWB wireless transceivers 102, 104.

Referring again to the graph 300 illustrated in FIG. 3, it is important to reiterate that despite having different peak maxima (A, B), both CIRs 301, 302 have a same leading edge 312, or similar shape, which establishes that a detected channel is an LOS channel, which is required when optimizing power consumption in accordance with embodiments of the present inventive concepts. In particular, the presence of an LOS channel permits a subsequent ranging sequence between UWB transceivers to be performed by allowing more noise to be introduced in the noise regime of measured CIRs and/or processing a CIR estimate that is inferior or of a poorer quality than that of a signal generated according to a fixed configuration that produces the best possible performance by a UWB wireless device. Accordingly, power can be reduced in ranging operations, e.g., subsequent distance measurements, when an LOS channel is detected notwithstanding the presence of additional noise or an inferior CIR estimate.

FIG. 2 is a flowchart illustrating a method 200 for optimizing power consumption of a UWB ranging apparatus, in accordance with some embodiments. In describing the method 200, reference is made to some or all elements of the UWB communication system 10 of FIG. 1. Accordingly, some or all steps of the method 200 may be executed by elements of the UWB communication system 10 of FIG. 1.

In some embodiments, the method 200 is initiated by a boot process executed by the device, i.e., the initiator apparatus 102, responding apparatus 104, or other apparatus that participates in a UWB ranging operation. For purposes of describing the method 200, reference is made to the initiator apparatus 102, notwithstanding that the method 200 can equally apply to the responder apparatus 104. For example, referring to FIG. 1, the boot routine may be stored in a memory of the initiator apparatus 102, but not limited thereto, so that a processor of the initiator apparatus 102 can execute the stored routine, which may include a sequence of instructions, for example, to clear a cache of the apparatus 102 to bring the apparatus 102 into a state of operability.

At block 202, the ranging initiator apparatus 102, or first UWB transceiver, is pre-configured, e.g., pre-programmed by a software program, for full device performance in a manner that produces the best possible performance by the UWB device. For example, the initiator apparatus 102 may be configured for parameters, for example, in compliance with the IEEE 802.15.4 standard to allow the initiator apparatus 102 and responder apparatus 104 to communicate. For example, communication may occur in channel 5 (~6.5 GHz) with a bandwidth of 500 MHz and a root-raised cosine pulse. Device-level parameters may include but not be limited to an analog-to-digital converter (ADC) sampling rate, supply voltage, and so on. Other parameters may include but not be limited to a channel bandwidth, wavelength, frequency, pulse, and/or other parameters that affect power requirements and consumption, which in turn may affect the performance of the apparatus 102. Generally, the best possible performance of the initiator apparatus 102 requires a greater power consumption, thereby increasing the load on the device's battery and reducing the battery life.

At block 204, a ranging operation is performed, for example, distance measurements are determined between the ranging initiator apparatus 102 and the responder apparatus 104 for positioning and location tracking applications or the like.

At decision diamond 206, the channel detection algorithm 128 determines from the CIR a type of channel included in the transmission channel, for example, an NLOS and/or LOS channel. LOS signal propagation has different characteristics than NLOS signal propagation, which can result in ToA measurements so it is important to identify the channel type for UWB location tracking applications.

If at decision diamond 206, an LOS channel is detected, then the method 200 proceeds to block 208 where the device performance is reduced by the device controller 130 for the next ranging sequence. In doing so, power consumption is reduced. Otherwise, if the channel is determined to be a channel other than an LOS channel and/or if a current channel begins to deteriorate, the method 200 returns to block 202, where the ranging operation continues at full device performance.

Referring again to FIG. 3, as previously mentioned, a ToA time stamp can be determined from a same leading edge of two measured CIRs for two different LOS channels, or different positions, of a first UWB wireless transceiver 102 relative to a second UWB wireless transceiver 104. As shown in the graphical representation 400 of a power optimization algorithm illustrated in FIG. 4, a cross-correlation function 420 matching a leading edge 412 (same as or similar to leading edge 312 shown in FIG. 3) can be computed, and used as an algorithm for power optimization according to some embodiments of the present inventive concepts.

Figure 4:
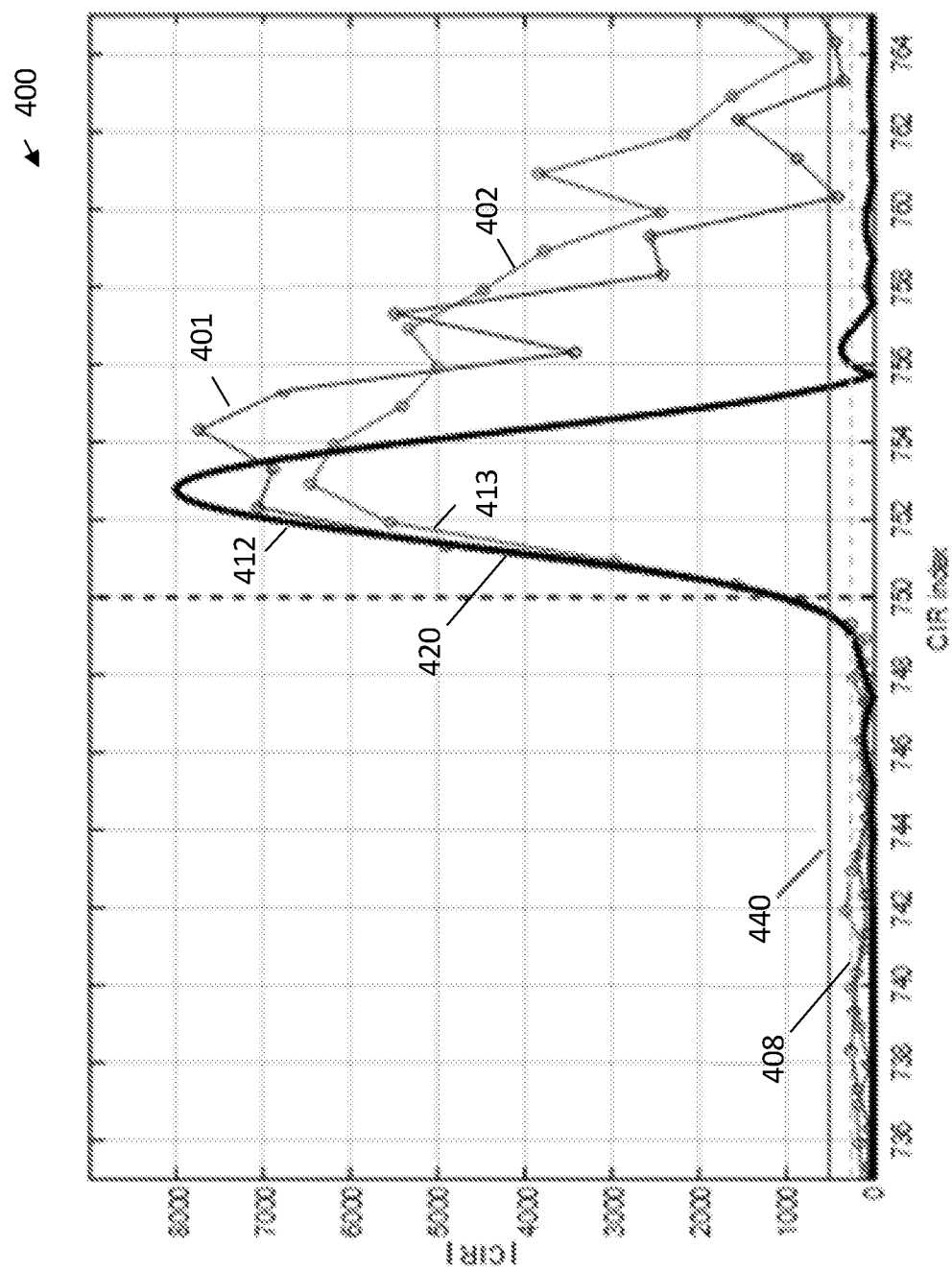
FIG. 4 is a graph illustrating a cross-correlation function for two line-of-sight (LOS) channels computed in compliance with the IEEE 802.15.4a standard, in accordance with some embodiments.
Figure 5:
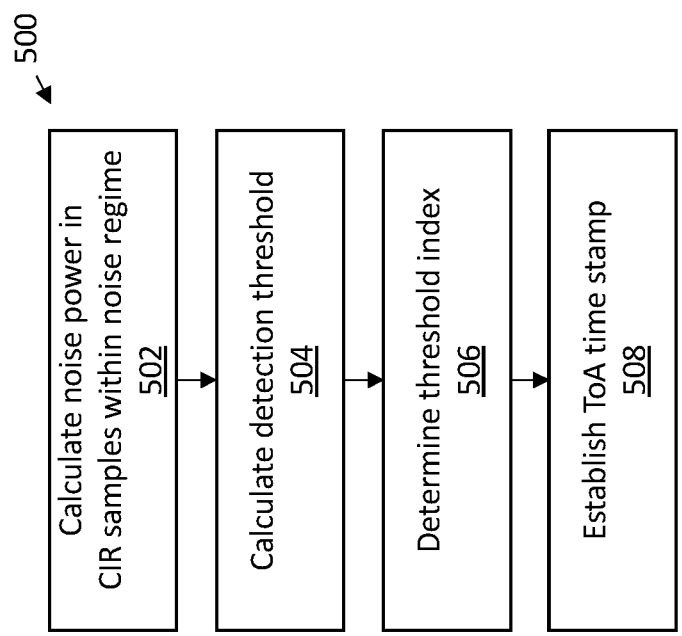
FIG. 5 is a flowchart illustrating a method for performing a ToA calculation between a UWB initiator apparatus and a UWB responder apparatus, in accordance with some embodiments.

FIG. 5 is a flowchart illustrating a method 500 for performing a ToA calculation by the power optimization algorithm depicted in the graph 400 of FIG. 4. Accordingly, in describing the method 500, reference is made to FIG. 4.

At block 502, a noise power measurement 430 is calculated from CIR estimates 401, 402 of a first LOS channel and a second LOS channel respectively. In some embodiments, the initiator apparatus 102 and the responder apparatus 104 each performs a noise power calculation on their respective devices in order to subsequently determine a detection threshold based on which a time stamp, or ToA, is computed. As shown in FIG. 4, the noise power 430 is calculated from the CIR samples 401,402 that are within the noise regime 408, or the region before the useful part of the CIR.

At block 504, a detection threshold 440 is calculated by multiplying the noise power 430 calculated at block 504 and a scaling factor. Accordingly, the detection threshold 440 may be referred to as a scaled noise power threshold.

At block 506, a threshold, or time, index, or the smallest index where a CIR 401, 402 exceeds the threshold 440, is determined. In some embodiments, one unit of the index corresponds to the sampling period of an ADC of the apparatus which in this case is 1 ns=1/(1 GHz). For example, as shown in FIG. 4, a first index exceeds the threshold (CIR Index=750) to provide a coarse resolution.

At block 508, a ToA time stamp is established. An interpolation step is performed between the coarse resolution (e.g., 750) determined in block 506 and the next smallest index unit (e.g., 749). Accordingly, a fractional index can be determined where the threshold is crossed, e.g., 749.5, which improves resolution.

Referring again to the graphical representation 400 in FIG. 4, in some embodiments, the cross-correlation function 420 is computed by matching the leading edge in the measured CIR(s) 401, 402 according to the IEEE 802.15.4a standard, and in particular, the following equation:

$$\phi(\tau) = \frac{1}{\sqrt{E_r E_p}} \operatorname{Re} \int_{-\infty}^{\infty} r(t) p^*(t+\tau) dt$$

where p(t) is the transmit/receive pulse and r(t) is a standard reference pulse, with $E_r$ and $E_p$ being the respective pulse energy. The reference pulse is a root-raised-cosine pulse defined as $$r(t) = \frac{4\beta}{\pi\sqrt{T_p}} \frac{\cos[(1+\beta)\pi t/T_p] + \dfrac{\sin[(1-\beta)\pi t/T_p]}{4\beta(t/T_p)}}{1-(4\beta t/T_p)^2}$$

where $T_p$ is the pulse width and $\beta$ is the roll-off factor. The transmit/receive pulse (envelope) is determined from chip measurements in LOS as $$p(t) = A \cos^2(\pi/T\, t)\ -T/2 < t < T/2$$

where T is the pulse width and A the amplitude. It is seen from the figure that in a LOS channel the leading edge has a predefined shape given by the cross-correlation function which can be used in an algorithm for power optimization.

Referring again to FIGS. 2-5, if the noise power 430 increases, the calculation performed in block 504 permits the scaling factor used to calculate the detection threshold to be reduced to arrive at the same or similar detection threshold, and therefore allow for the same ranging accuracy.

Similarly, since the leading edge in an LOS channel 401, 402 is determined by the known cross-correlation function, the function can be used in the TOA algorithm even if the noise power 430 is increased.

In some embodiments, additional noise is permitted, resulting in the need for less power consumed by RF analog circuits or electrical components of the UWB transceiver 102, such as phase-locked loop circuits, local oscillator drivers, anti-aliasing filters, and so on.

As mentioned above, another approach for reducing power is to process a CIR estimate that is inferior or of a poorer quality than that of a signal generated according to a fixed configuration that produces the best possible performance by a UWB wireless device. In some embodiments, the CIR is estimated from the correlation result between a transmit/receive pulse and a reference pulse over a preamble symbol. Averaging over multiple preamble symbols is done to improve the signal-to-noise ratio because the transmit/receive pulse may be submerged in noise under poor channel conditions. In a LOS channel, however, the pulse is already strong relative to the noise, so the number of preamble symbols used for averaging can be reduced during operation to save power. Similarly, the number of samples used for the correlation, for establishing a correlator length or the like, may also be reduced. In some embodiments, other approaches for reducing power of a UWB transceiver may include reducing an ADC sampling rate, number of ADC bits, or related ADC feature.

The foregoing embodiments illustrated and described with respect to FIGS. 2-5 pertain to device or computer chip level power consumption. However, other embodiments may accommodate system-level configurations, for example, where multiple UWB ranging devices operate simultaneously (e.g. to localize an object in 3D), power optimization may also be done on a system level.

Figure 6:
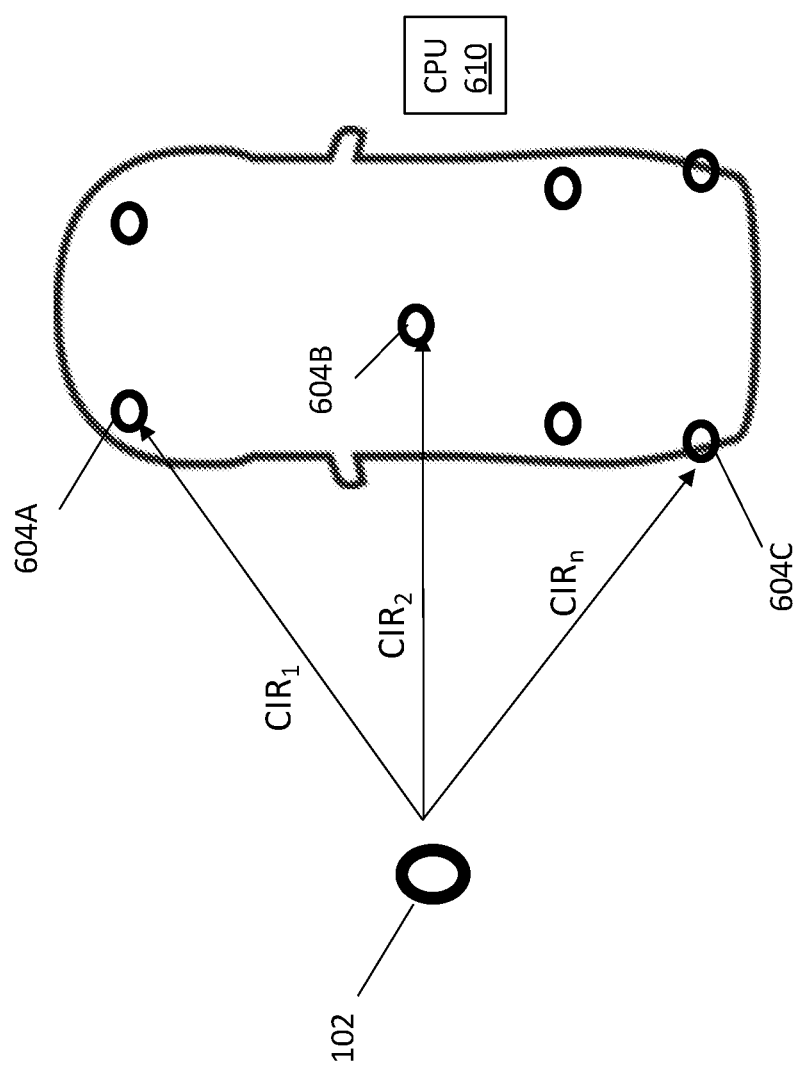
FIG. 6 is an illustration of an application of a UWB communication system implemented for an automobile, in accordance with another example embodiment.

Referring to FIG. 6, a key fob 102 or related UWB device communicates with multiple UWB anchor devices 604A-C (generally, 604) locates at various regions of an automobile such as the bumper, roof, dashboard, and so. The UWB anchor devices 604 can be controlled by a CPU 610, which can be co-located with the anchor devices 604 at the automobile or the like, or at a different location and in wireless communication with the anchor devices 604 and/or key fob 102.

Figure 7:
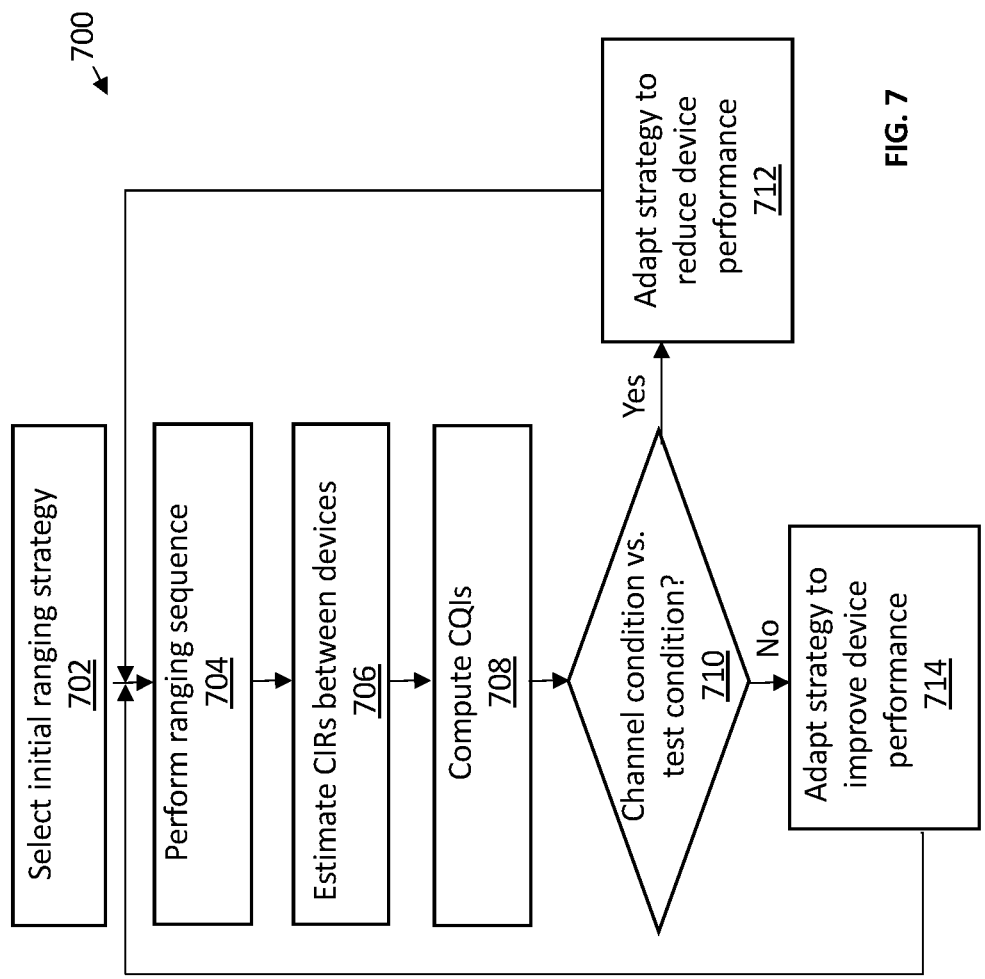
FIG. 7 is a flowchart illustrating a method for optimizing power consumption of a system including multiple UWB ranging apparatuses, in accordance with some embodiments.

FIG. 7 is a flowchart illustrating a method 700 for optimizing power consumption of a system including multiple UWB ranging apparatuses, in accordance with some embodiments. In describing the method 700, reference may be made to elements of FIG. 6. For example, some or all of the method 700 may be performed by one or more special processors such as the CPU 610 of FIG. 6 and/or a device controller of a UWB ranging device, such as the key fob 102 shown in FIGS. 1 and 6.

At block 702, an initial strategy for ranging between the key fob 102 and one or more UWB anchor devices 604 is selected by the CPU 610. The initial strategy may be implemented as an electronic profile that is stored in computer memory and executed by a hardware processor of the UWB ranging apparatus. The initial strategy may be selected according to one or more predetermined parameters, including but not limited to a number of UWB devices configured for a fine ranging operation, a number of ranging measurements during a given time interval, a default device performance level, for example, configured for 100% performance. Here, a UWB ranging apparatus such as anchor devices 604 and/or key fob 102 may operate at its limit (hence, 100% performance) within the design specification, processing analog signals with the lowest possible noise contribution and signal distortion and at the highest possible supply voltage, and processing digital signals at the highest clock frequency with all available number of bits.

Example metrics establishing such performance limits may include but not be limited to clock/sampling frequency for the ADC, a number of bits used for processing, e.g., ADC bits or correlator bits, supply voltage which determines noise performance, and so on.

Referring to FIG. 6, an initial strategy may be to configure the anchors 604 that depends on whether the key fob 102 is within a predetermined range about the automobile, such as a Thatcham zone, i.e., 2 m distance, about the automobile.

At block 704, a first ranging sequence is performed with at least two ranging devices according to the initial strategy in block 702.

At block 706, after the first ranging sequence is performed, the corresponding CIRs are estimated, and at block 708, a set of channel quality indicators (CQIs) are computed. In some embodiments, both the fob 102 and automobile anchors 604 compute the CQIs. In some embodiments, the automobile anchor(s) 604 perform this computation. In some embodiments, the CPU 610 performs this computation. For example, as shown in FIG. 6, $CIR_1$ through $CIR_N$ are computed for data exchanges between key fob 102 and UWB anchors 604A-C, respectively. In some embodiments, the CQI is computed to determine the magnitude of the peak in a CIR and the difference of the indices of the peak and the detected first path. Lower CQI values, on the other hand, generally indicate poor channels. An LOS channel is identified as having a high peak and a small index difference, for example, illustrated in FIG. 3.

Accordingly, at decision diamond 710, the computed CQI values indicating a channel condition can be compared to a test condition. The threshold may be application-specific. Test conditions may be any of examples provided herein. Other test conditions may include the maximum difference over a range of index values between a measured leading edge, for example, edges 412, 413 shown in FIG. 4, and the expected leading edge, e.g., corresponding to correlation function curve 420 shown in FIG. 4, is below a certain numerical value. For example, LOS peak A shown in FIG. 3 may serve as a threshold. If a CQI value is determined to have a smaller peak than peak A in FIG. 3, a greater index different than that shown in FIG. 3, and/or produces characteristics indicative of a poorer channel quality than shown in the graph 300 of FIG. 3, then the method 700 proceeds to block 712, where the initial strategy in block 702 is adapted to reduce device performance of the at least two devices in participating in the first ranging sequence of step 704. Here, the CPU 610 selects a strategy, or modifies a current strategy for subsequent ranging sequences, for example, a second ranging sequence following the first ranging sequence of block 704 with the objective of optimizing power of the key fob 102 or other UWB ranging initiator apparatus and/or relevant anchor(s) 604 participating in the data exchange during the first ranging sequence. For example, the strategy can be adapted to reduce the number of measurements, configured or reconfigured to include a fewer number of UWB anchors 604 in subsequent ranging sequences, reduce the device performance of the active anchors, and/or other actions that reduce the need for battery power or other power source. Accordingly, the method 700 returns to block 704 where one or more subsequent ranging sequences are performed at the new or adapted strategy corresponding to the reduced performance level.

Conversely, if at decision diamond 710 a computed CQI value does not satisfy or meet the test condition, or falls less than a threshold, then the method 700 proceeds to block 714, where performance is increased in the at least two devices in participating in the first ranging sequence, and the method 700 returns to block 704 where one or more subsequent ranging sequences are performed at the new or adapted strategy corresponding to the increased performance level.

As will be appreciated, embodiments as disclosed include at least the following. In one embodiment, an ultra-wideband (UWB) wireless communication system, comprises a first wireless apparatus; a second wireless apparatus that participates in a first ranging sequence with the first wireless apparatus; and a transmission channel between the first and second wireless apparatuses that transmits data of the first ranging sequence, at least one of the first wireless apparatus or second wireless apparatus generating at least one channel impulse response (CIR) and determining from the at least one CIR whether the transmission channel includes a line-of-sight channel; and a special purpose processor that reduces a current performance level of at least one of the first and second wireless apparatuses during a second ranging sequence in response to a determination that the transmission channel includes the line-of-sight channel.

Alternative embodiments of the UWB wireless communication system include one of the following features, or any combination thereof. The first wireless apparatus is a UWB ranging initiator apparatus of a key fob and the second wireless apparatus is a UWB responder apparatus of an antenna anchor. The special purpose processor includes a channel detection processor that establishes a leading edge of the at least one CIR measured at a position of the second wireless apparatus. The line-of-sight channel is identified by matching the leading edge of the at least one CIR and a cross-correlation function computed according to an IEEE 802.15.4a standard. The special purpose processor reduces the current performance level of the first wireless apparatus in the second ranging sequence by reducing a quality of an estimate of the at least one CIRs, a supply voltage, a number of preamble symbols used to establish a correlation result, an analog-to-digital converter (ADC) sampling rate, a number of ADC bits, or a combination thereof. Each of the first and second wireless apparatuses processes a UWB signal provided by the transmission channel to compute a time-of-arrival (TOA) of the signal, which in turn is used by the first wireless apparatus to determine a time-of-flight and range between the first and second wireless apparatuses. The first and second wireless apparatus determine each of a noise power level of the at least one CIR within the noise regime, a detection threshold from the noise power level, and the TOA from an index where the at least one CIR exceeds the detection threshold. The first wireless apparatus includes one or more analog circuits, oscillator drivers, and filters, and wherein the special purpose processor reduces the current performance level of the one or more analog circuits, oscillator drivers, and filters during the second ranging sequence in response to a determination that the transmission channel includes the line-of-sight channel. A channel quality indicator is determined from the at least one CIR, wherein the line-of-sight channel is determined from the channel quality indicator.

In another embodiment, an ultra-wideband (UWB) wireless transceiver, comprises a transceiver circuitry and an associated antenna that detect and quantify an UWB signal a ranging processor that generates at least one channel impulse response (CIR) from the UWB signal; a signal detector that determines an estimated time-of-arrival (TOA) from the CIR; a channel detection algorithm processor that determines a line-of-sight channel between the UWB wireless transceiver and another UWB wireless transceiver from the CIR; and a device controller that reduces a current performance level of at least one of the UWB wireless transceiver in response to a determination that the transmission channel includes the line-of-sight channel.

Alternative embodiments of the ultra-wideband (UWB) wireless transceiver include one of the following features, or any combination thereof. The first wireless apparatus is a UWB ranging initiator apparatus of a key fob. The transceiver further comprises a channel detection processor that establishes a leading edge of the at least one CIR measured at a position of the second wireless apparatus. The line-of-sight channel is identified by matching the leading edge of the at least one CIR and a cross-correlation function computed according to an IEEE 802.15.4a standard. The special purpose processor reduces the current performance level of the first wireless apparatus in the second ranging sequence by reducing a quality of an estimate of the at least one CIRs, a supply voltage, a number of preamble symbols used to establish a correlation result, an analog-to-digital converter (ADC) sampling rate, a number of ADC bits, or a combination thereof. The UWB wireless transceiver further includes one or more analog circuits, oscillator drivers, and filters, and the device controller reduces the current performance level of the one or more analog circuits, oscillator drivers, and filters during the second ranging sequence in response to a determination that the transmission channel includes the line-of-sight channel.

In another embodiment, a method for controlling power consumption of an ultra-wideband (UWB) apparatus comprises outputting, from a first wireless apparatus to a second wireless apparatus, a first electronic message; storing at the first wireless apparatus a first time stamp of transmission of the first electronic message; determining at the second wireless apparatus a first channel impulse response (CIR) and a time-of-arrival of the first electronic message; storing at the second wireless apparatus a second time stamp of transmission of the first electronic message corresponding to the time-of-arrival of the first electronic message; outputting, from the second wireless apparatus to the first wireless apparatus, a second electronic message that includes the second time stamp and a third time stamp of transmission of the second electronic message; determining at the first wireless apparatus a second channel impulse response (CIR) and a time-of-arrival of the second electronic message; detecting whether a line-of-sight channel is present between the first and second apparatus from the CIR of the second electronic message; and reducing a current performance level of the first wireless apparatus during a subsequent ranging sequence in response to a detection of the line-of-sight channel.

Alternative embodiments of the method include one of the following features, or any combination thereof. The method further comprises determining a fourth time stamp corresponding to the time-of-arrival of the second electronic message; and determining a time-of-flight and range between the first and second wireless apparatuses from the first, second, third, and fourth time stamps. The line-of-sight channel is identified by establishing a leading edge of the second CIR and matching the leading edge of the second CIR and a cross-correlation function.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. An ultra-wideband (UWB) wireless communication system, comprising:
    a first wireless apparatus;
    a second wireless apparatus that participates in a first ranging sequence with the first wireless apparatus; and
    a transmission channel between the first and second wireless apparatuses that transmits data of the first ranging sequence, at least one of the first wireless apparatus or second wireless apparatus generating at least one channel impulse response (CIR) and determining from the at least one CIR whether the transmission channel includes a line-of-sight channel; and
    a special purpose processor that reduces a current performance level of at least one of the first and second wireless apparatuses during a second ranging sequence in response to a determination that the transmission channel includes the line-of-sight channel wherein the second wireless apparatus includes a plurality of UWB ranging devices that each communicates with the first wireless apparatus, and wherein the UWB wireless communication system further includes a central processing unit that controls the plurality of UWB ranging devices to optimize power consumption of a combination of the first wireless apparatus and the plurality of UWB ranging devices of the second wireless apparatus.

2. The UWB wireless communication system of claim 1, wherein the first wireless apparatus is a UWB ranging initiator apparatus of a key fob and the second wireless apparatus is a UWB responder apparatus of an antenna anchor.

3. The UWB wireless communication system of claim 1, wherein the special purpose processor includes a channel detection processor that establishes a leading edge of the at least one CIR measured at a position of the second wireless apparatus.

4. The UWB wireless communication system of claim 3, wherein the line-of-sight channel is identified by matching the leading edge of the at least one CIR and a cross-correlation function computed according to an IEEE 802.15.4a standard.

5. The UWB wireless communication system of claim 4, wherein the special purpose processor reduces the current performance level of the first wireless apparatus in the second ranging sequence by reducing a quality of an estimate of the at least one CIRs, a supply voltage, a number of preamble symbols used to establish a correlation result, an analog-to-digital converter (ADC) sampling rate, a number of ADC bits, or a combination thereof.

6. The UWB wireless communication system of claim 1, wherein each of the first and second wireless apparatuses processes a UWB signal provided by the transmission channel to compute a time-of-arrival (TOA) of the signal, which in turn is used by the first wireless apparatus to determine a time-of-flight and range between the first and second wireless apparatuses.

7. The UWB wireless communication system of claim 6, wherein the first and second wireless apparatus determine each of a noise power level of the at least one CIR within the noise regime, a detection threshold from the noise power level, and the TOA from an index where the at least one CIR exceeds the detection threshold.

8. The UWB wireless communication system of claim 7, wherein the first wireless apparatus includes one or more analog circuits, oscillator drivers, and filters, and wherein the special purpose processor reduces the current performance level of the one or more analog circuits, oscillator drivers, and filters during the second ranging sequence in response to a determination that the transmission channel includes the line-of-sight channel.

9. The UWB wireless communication system of claim 1, wherein a channel quality indicator is determined from the at least one CIR, wherein the line-of-sight channel is determined from the channel quality indicator.

10. An ultra-wideband (UWB) wireless transceiver, comprising:
    a transceiver circuitry and an associated antenna that detect and quantify an UWB signal;
    a ranging processor that generates at least one channel impulse response (CIR) from the UWB signal;
    a signal detector that determines an estimated time-of-arrival (TOA) from the CIR;
    a channel detection algorithm processor that determines a line-of-sight channel between the UWB wireless transceiver and another UWB wireless transceiver from the CIR; and
    a device controller that reduces a current performance level of at least one of the UWB wireless transceiver in response to a determination that the transmission channel includes the line-of-sight channel;
    wherein the ranging processor determines each of a noise power level of the at least one CIR within the noise regime, a detection threshold from the noise power level, and the TOA from an index where the at least one CIR exceeds the detection threshold.

11. The UWB wireless transceiver of claim 10, wherein the first wireless apparatus is a UWB ranging initiator apparatus of a key fob.

12. The UWB wireless transceiver of claim 10, further comprising a channel detection processor that establishes a leading edge of the at least one CIR measured at a position of the second wireless apparatus.

13. The UWB wireless transceiver of claim 12, wherein the line-of-sight channel is identified by matching the leading edge of the at least one CIR and a cross-correlation function computed according to an IEEE 802.15.4a standard.

14. The UWB wireless transceiver of claim 13, wherein the special purpose processor reduces the current performance level of the first wireless apparatus in the second ranging sequence by reducing a quality of an estimate of the at least one CIRs, a supply voltage, a number of preamble symbols used to establish a correlation result, an analog-to-digital converter (ADC) sampling rate, a number of ADC bits, or a combination thereof.

15. The UWB wireless transceiver of claim 10, further including one or more analog circuits, oscillator drivers, and filters, and wherein the device controller reduces the current performance level of the one or more analog circuits, oscillator drivers, and filters during the second ranging sequence in response to a determination that the transmission channel includes the line-of-sight channel.

16. The UWB wireless transceiver of claim 10, wherein a channel quality indicator is determined from the at least one CIR, wherein the line-of-sight channel is determined from the channel quality indicator.

17. A method for controlling power consumption of an ultra-wideband (UWB) apparatus, comprising:
outputting, from a first wireless apparatus to a second wireless apparatus, a first electronic message;
storing at the first wireless apparatus a first time stamp of transmission of the first electronic message;
determining at the second wireless apparatus a first channel impulse response (CIR) and a time-of-arrival of the first electronic message;
storing at the second wireless apparatus a second time stamp of transmission of the first electronic message corresponding to the time-of-arrival of the first electronic message;
outputting, from the second wireless apparatus to the first wireless apparatus, a second electronic message that includes the second time stamp and a third time stamp of transmission of the second electronic message;
determining at the first wireless apparatus a second channel impulse response (CIR) and a time-of-arrival of the second electronic message;
detecting whether a line-of-sight channel is present between the first and second wireless apparatus from the CIR of the second electronic message; and
reducing a current performance level of the first wireless apparatus during a subsequent ranging sequence in response to a detection of the line-of-sight channel.

18. The method of claim 17, further comprising:
determining a fourth time stamp corresponding to the time-of-arrival of the second electronic message; and
determining a time-of-flight and range between the first and second wireless apparatuses from the first, second, third, and fourth time stamps.

19. The method of claim 17, wherein the line-of-sight channel is identified by establishing a leading edge of the second CIR and matching the leading edge of the second CIR and a cross-correlation function.

* * * * *